United States Patent [19]
Nefedov et al.

[11] 3,860,378
[45] Jan. 14, 1975

[54] MACHINE FOR FABRICATING CYLINDRICAL GRANULES OF PASTY MATERIALS

[76] Inventors: Vladimir Nikolaevich Nefedov, ulitsa Zhely-abova, 13, kv. 45; Zinaida Petrovna Anokhina, Angarsky prospekt, 2, kv. 23; Vladimir Afanasievich Zimin, ulitsa Pushkina, 9/13, kv. 1; Ardalion Dmitrievich Shirvatov, ulitsa Karla Marxa, 59, kv. 54, all of Angarsk, U.S.S.R.

[22] Filed: Sept. 7, 1972

[21] Appl. No.: 285,735

[52] U.S. Cl. .................. 425/302, 425/307, 425/315
[51] Int. Cl. ............................................. B29c 24/00
[58] Field of Search ........... 425/142, 302, 306, 307, 425/315

[56] References Cited
UNITED STATES PATENTS
3,350,757   11/1967   Bowles.............................. 425/302
3,487,954   1/1970   Pearne et al.................... 425/307 X FOREIGN PATENTS OR APPLICATIONS
934,556   10/1955   Germany........................... 425/302
846,546   8/1960   Great Britain...................... 425/142
262,678   5/1970   U.S.S.R............................. 425/307

*Primary Examiner*—R. Spencer Annear
*Attorney, Agent, or Firm*—Waters, Roditi, Swartz & Nissen

[57] ABSTRACT

A machine for fabricating cylindrical granules of pasty materials which are used as a catalyst in conducting chemical processes. The machine comprises an extruder and a moulding device consisting of a throw-off drum incorporating radial blades extending longitudinally along the drum, the string of pasty material being fed between the blades by the extender. A ratchet gear is connected to an electromagnet and serves for rotating the drum, the ratchet gear being mounted at one end of the shaft of the drum. Located adjacent the extruder is a cutting assembly for cutting off the moulded string between the extruder and the throw-off drum, the cutting assembly being connected to a drive gear so that the cutting of the string takes place prior to its being thrown off the drum blades. Thus, the string is fed to the disc knives so that its axis and the axis of the shaft of the knives are held parallel enabling the granules to be cut into regular shape.

8 Claims, 2 Drawing Figures

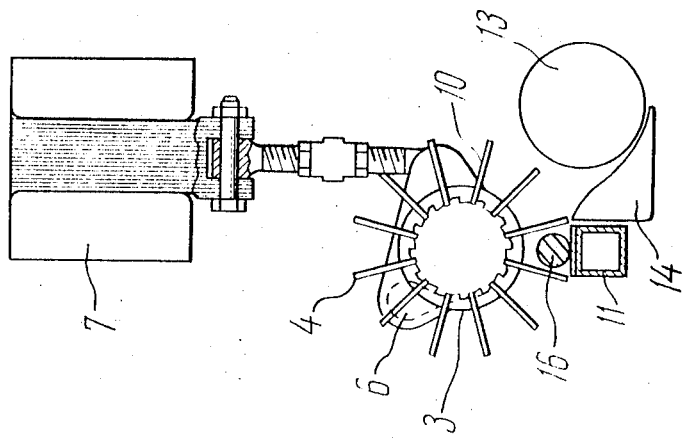
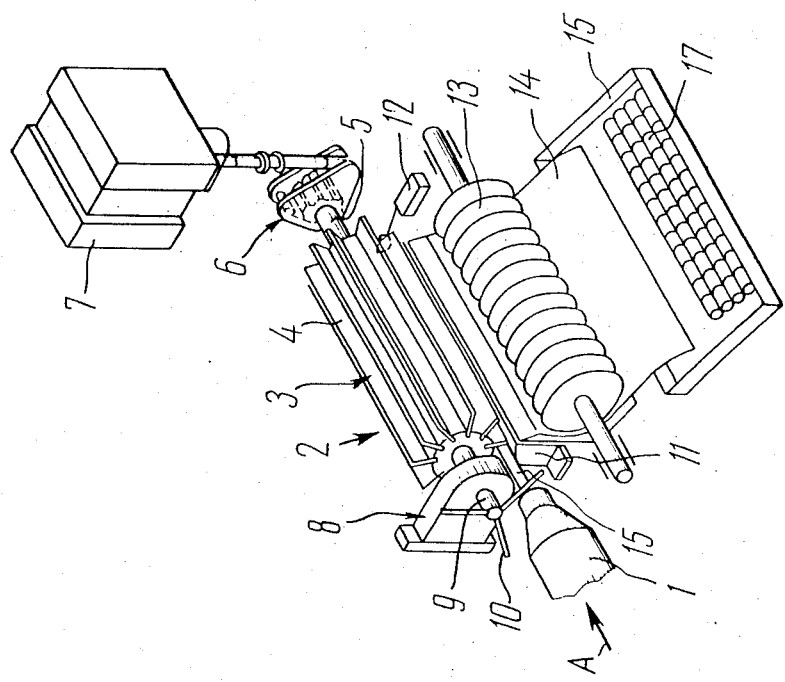
FIG. 2
FIG. 1

MACHINE FOR FABRICATING CYLINDRICAL GRANULES OF PASTY MATERIALS

The invention relates to equipment for granulating various pasty materials used as catalysts for conducting chemical processes, and more particularly, to machines for fabricating cylindrical granules of pasty materials.

Known in the art is a machine for moulding cylindrical granules, comprising a mixer, an extruder, and cutting and throwing-off mechanisms.

The cylindrical string of plastic material coming out of the extruder is mounted on the guide between plates of a frame throwing-off device which is set in reciprocating motion by two electromagnets actuated in turn. The end of the string presses against the contact plate of the switch actuating one of the two electromagnets and setting in motion the frame throwing-off device. A middle plate of the device cuts off the string at the matrix of the extruder. The frame-throwing-off device shifts the cut-off string from the guide and feeds it downwardly under revolving disc knives.

In this case, the loose end of the string falls more quickly than the end cut off by the middle plate of the frame throwing-off device, and the string falls under the disc knives so that the axes of the string and the disc knives are not held parallel. The lag in the dropping of the loose end of the string occurs because the cutting and the throwing of the loose end of the guide does not take place simultaneously.

Being rolled under the disc knives when the axis of the string and that of the disc knives are not held parallel, the string is cut into granules of irregular shape with helically grooved notches left on them. These notches, when the granules are used as catalysts for conducting catalytic processes, reduce their mechanical strength and increase the wear of the granules in transportation.

An object of the present invention is to provide a machine which eliminates the above disadvantages.

A particular object of the invention is to provide a machine for fabricating cylindrical granules of pasty materials capable of producing cylindrical granules of regular shape.

This is accomplished by a machine for fabricating cylindrical granules of pasty materials, wherein, according to the invention, the moulding device comprises a throw-off drum with longitudinally extending radial blades, with a string of pasty material being located between the blades, a ratchet gear connected to an electromagnet for rotating the drum being mounted at one side of the shaft thereof, and a cutting assembly located adjacent the extruder for cutting off the moulded string between the extruder and the throw-off drum, said cutting assembly being connected prior to its throwing off from the drum blades.

The proposed moulding device in the machine for fabricating cylindrical granules makes it possible to obtain high-quality granules due to eliminating any bending in the string prior to its feeding to the disc knives, i.e., the surface of the granules become free of the screw-grooved notches that reduce granule strength, increase their wear and the hydraulic resistance of the fit of the reactor wherein the obtained product is used.

A specific embodiment of the present invention will now be described, by way of example, with reference to the accompanying drawings, wherein:

FIG. 1 is a perspective view of a machine, according to the invention, for fabricating cylindrical granules; and FIG. 2 is an end view of the machine as seen in the direction of arrow A.

The machine for fabricating cylindrical granules comprises an extruder 1 (FIG. 1) providing a continuous cylindrical string 15, and a moulding device 2 producing cylindrical granules.

The moulding device comprises a throw-off drum 3 (FIG. 2) incorporating spaced radial blades extending longitudinally along the drum, with a string 16 of pasty materials being located therebetween. On the shaft of the throw-off drum 3 there is a ratchet gear 6 for rotating the drum, said gear being connected to electromagnet 7. Adjacent the extruder 1 is a double step-up reduction gear 8 with an output shaft 9 fixedly carrying a three-blade cutting knife 10.

Located under the throw-off drum 3 is a guide 11 on which the string moves when discharged from the matrix of the extruder 1. At the end of the guide there is a switch 12 which closes the electric circuit containing the winding of the electromagnet 7.

A plurality of disc knives 13 are mounted on a support shaft which is located so that its axis is parallel to the axis of the throw-off drum 3. Located under the disc knives is a chute 14 and a receiver 15.

The machine for fabricating cylindrical granules of pasty materials constructed according to the invention, operates in the following manner.

The string 16 (FIG. 2) is squeezed out of the extruder 1 and moves along the guide 11 between the blades 4 of the throw-off drum 3. At the end of the guide 11 the string 16 presses against the contact plate of the switch 12 which closes the electric circuit of the winding of the electromagnet 7. The armature of the electromagnet 7 is drawn in and it rotates the throw-off drum 3 via the ratchet gear 6 by an angle corresponding to the number of the blades 4 on the drum 3.

At the start of the rotation, the cutting knife 10 connected through the step-up reduction gear to the shaft 5 of the drum 3, cuts the string 16 at the matrix of the extruder 1. By means of the blade of the drum 3, the cut-off string 16 is thrown off under the revolving disc knives 13 such that the axis of the string and the axis of the shaft supporting the knives 13 are held parallel.

This is ensured by separation of the processes of cutting the string 16 and throwing it off the guide 11, since the cutting knives revolve quicker than the throw-off drum 3.

Being rolled under the knives 13, the string 16 is cut into granules 17 of regular shape. The granules 17 roll down the chute 14 into the receiver 15 and then onto a conveyer (not shown).

What is claimed is:

1. A machine for fabricating cylindrical granules of pasty material, said machine comprising an extruder for extruding a string of pasty material, means adjacent said extruder for receiving said string therefrom to form cylindrical granules from said string, said means including: a throw-off drum with spaced radial blades thereon extending longitudinally along said drum; said string being fed from said extruder between the blades on said drum; a rotatable shaft supporting said drum; a ratchet gear coupled to said shaft for rotating the same; and an electromagnet connected to said ratchet gear to operate the same and thereby rotate said drum to discharge said string from said drum; a drive gear mounted on said shaft of the drum, and a cutting knife coupled to said drive gear for cutting said string between the extruder and the throw-off drum prior to discharge of the string from the blades of the drum.

2. A machine as claimed in claim 1 wherein said drive gear has a gear ratio to provide more rapid rotation of said cutting knife as compared to said throw-off drum.

3. A machine as claimed in claim 1 wherein said means further comprises a cutting assembly including a rotatable shaft and cylindrical knives mounted on said shaft adjacent said throw-off drum.

4. A machine as claimed in claim 3 wherein the shaft of the throw-off drum and the shaft of the cutting assembly are parallel.

5. A machine as claimed in claim 4 wherein said cylindrical knives are mounted perpendicularly on said shaft of the cutting assembly.

6. A machine as claimed in claim 3 wherein said means further comprises a guide member positioned adjacent said extruder for support of the string extruded from the extruder, said guide member being positioned beneath the throw-off drum so that the blades thereon will throw-off the string on the guide member towards the cutting assembly.

7. A machine as claimed in claim 3 comprising a guide chute adjacent the cutting assembly for guidably feeding granules formed from the string in the cutting assembly.

8. A machine as claimed in claim 1 wherein said drive gear and ratchet are at opposite ends of the shaft of the throw-off drum.

* * * * *